United States Patent [19]

Lowther

[11] 4,240,381
[45] Dec. 23, 1980

[54] INTERNAL COMBUSTION ENGINE SYSTEM

[75] Inventor: Frank E. Lowther, Buffalo, N.Y.

[73] Assignee: Purification Sciences Inc., Geneva, N.Y.

[21] Appl. No.: 37,161

[22] Filed: May 8, 1979

Related U.S. Application Data

[63] Continuation-in-part of Ser. No. 972,786, Dec. 26, 1978, Ser. No. 970,320, Dec. 18, 1975, Ser. No. 955,896, Oct. 30, 1978, abandoned, Ser. No. 961,264, Nov. 26, 1978, Ser. No. 955,895, Oct. 30, 1978, abandoned, and Ser. No. 951,383, Oct. 16, 1978.

[51] Int. Cl.³ .............................................. F02B 41/00
[52] U.S. Cl. ...................................... 123/26; 123/302; 123/316
[58] Field of Search ................... 123/26, 75 E, 75 B, 123/105, 112, 115, 119 D, 124 R

[56] References Cited

U.S. PATENT DOCUMENTS

| | | | |
|---|---|---|---|
| 2,292,233 | 8/1942 | Lysholm | 123/75 E |
| 2,344,993 | 3/1944 | Lysholm | 123/105 |
| 2,773,490 | 12/1956 | Miller | 123/75 E |
| 3,141,448 | 7/1964 | Candelise | 123/26 |
| 3,814,065 | 6/1974 | Gospooar | 123/26 |
| 3,919,986 | 11/1975 | Goto | 123/75 E |
| 3,986,351 | 10/1976 | Woods et al. | 123/75 E X |
| 3,991,729 | 11/1976 | Notaro | 123/124 R X |

FOREIGN PATENT DOCUMENTS

2405285  8/1975  Fed. Rep. of Germany ...... 123/119 D

Primary Examiner—Tony M. Argenbright

[57] ABSTRACT

An internal combustion engine 10 wherein only some compression is carried out in the engine 10 and including a tank 30 of compressed air, a pressure regulator 34, a fuel injector 28, and means 40 and 50 for connecting the foot pedal 38 to the pressure regulator 34 and the fuel injector 28, for controlling air and fuel feed to the combustion chambers 22 in response to throttle demand during high power demand conditions. The engine 10 compresses its own air for cruise conditions but uses stored compressed air (charged from a wayside source) for higher power demand. The engine can use spark or heat ignition, provides full expansion, can be two or four stroke and of the diesel or gasoline type. Compressed air can be generated more efficiently using central station power with a vast savings in the amount of oil consumed. Oxygen enriched (60–80% $O_2$) compressed air can be used without high temperature problems because of the only partial compression and the high (cooling) expansion ratio and higher rpm.

52 Claims, 11 Drawing Figures

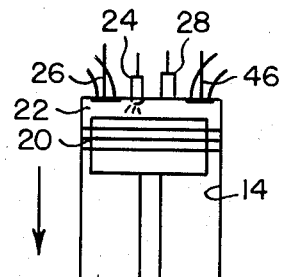
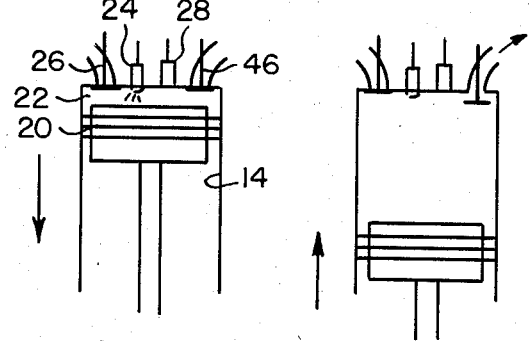
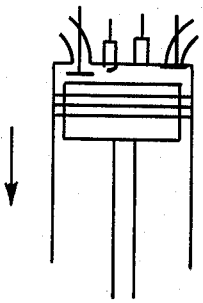
Start of Power
FIG. 3A
Start of Exhaust
FIG. 3B
Start of Intake of Air/Fuel Mixture
FIG. 3C
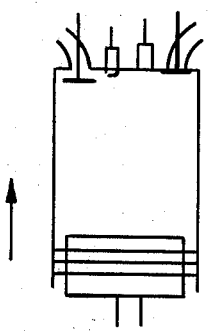
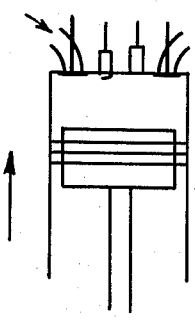
FIG. 3D
Start of Compression
FIG. 3E
FIG. 3 FOUR-STROKE GASOLINE ENGINE-CRUISE

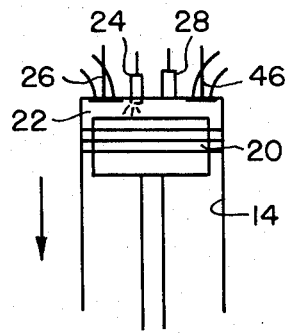
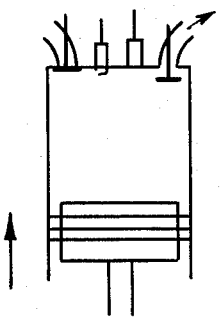
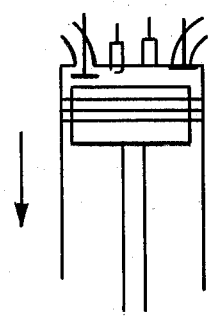
Start of Power
FIG. 4A
Start of Exhaust
FIG. 4B
Start of Intake of Air/Fuel Mixture
FIG. 4C
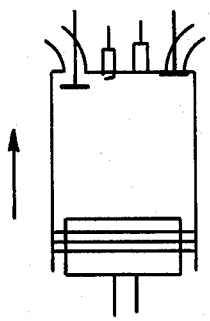
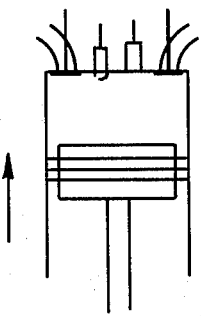
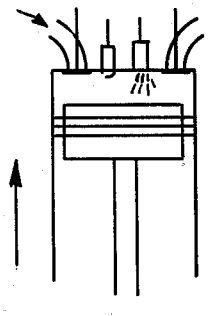
FIG. 4D
Start of Compression
FIG. 4E
Start of Injection of Compressed Air/Fuel
FIG. 4F
FIG. 4  FOUR-STROKE GASOLINE ENGINE - POWER

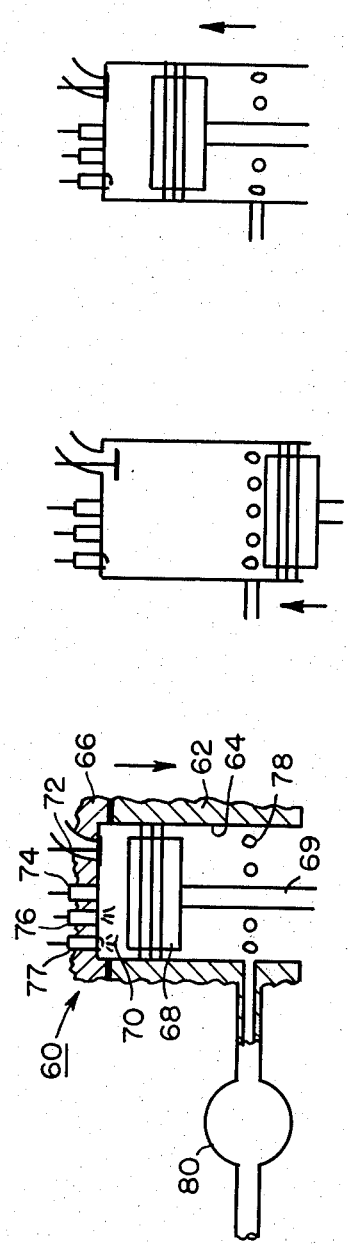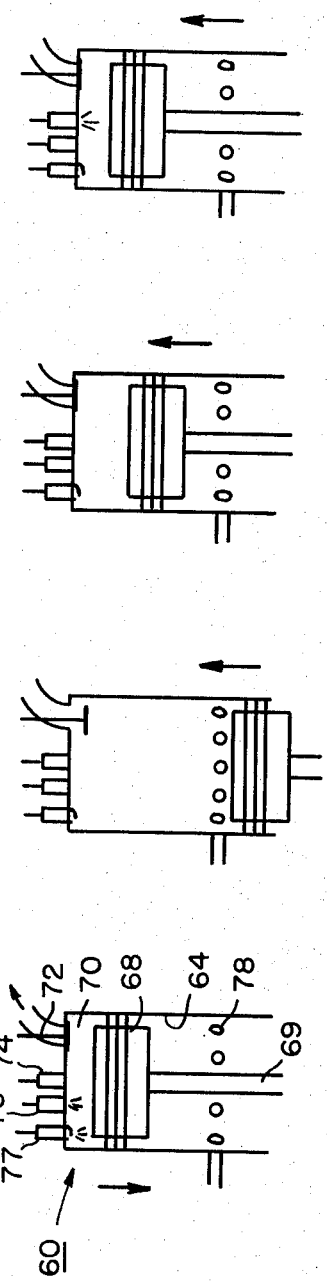

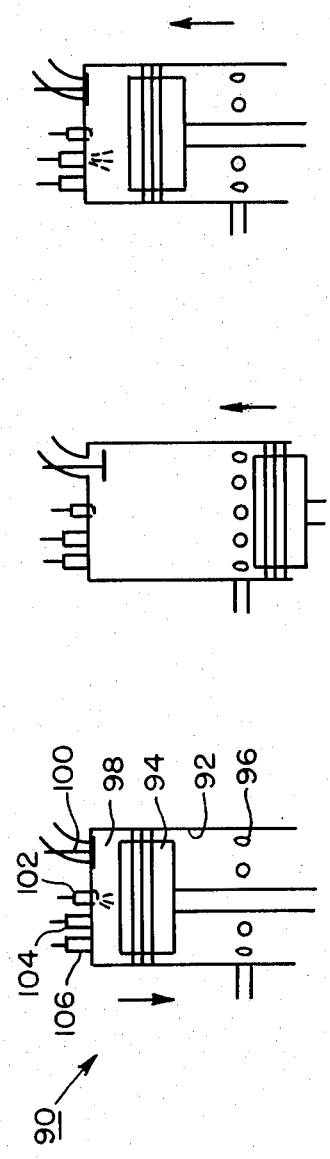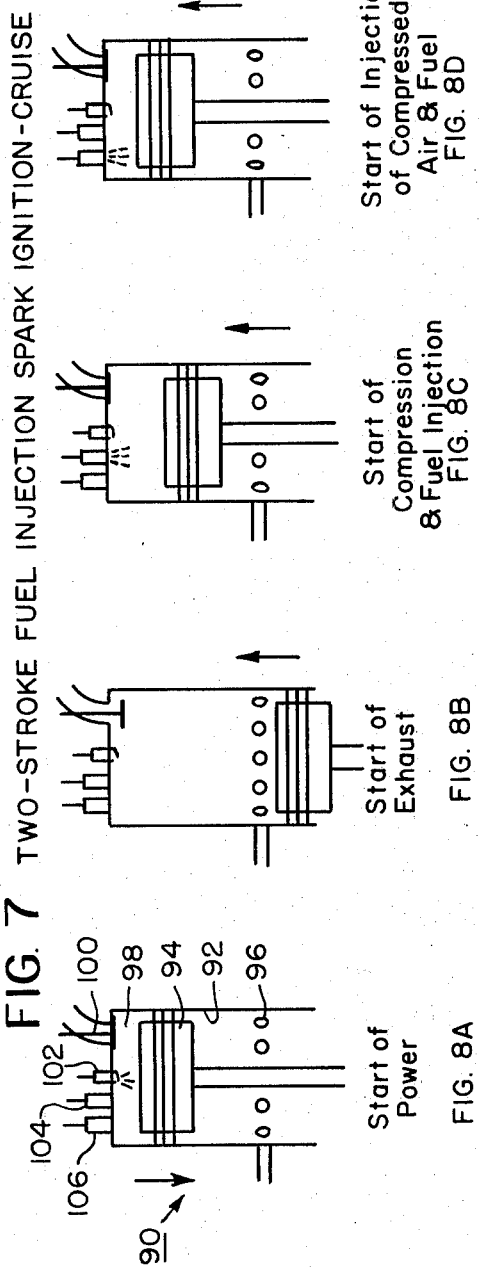
FIG. 7 TWO-STROKE FUEL INJECTION SPARK IGNITION-CRUISE
FIG. 8 TWO-STROKE FUEL INJECTION SPARK IGNITION-POWER

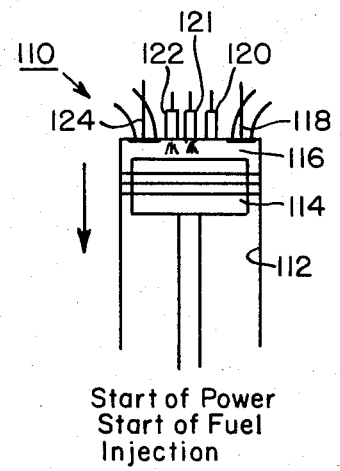
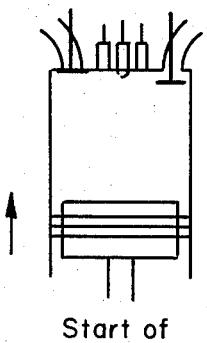
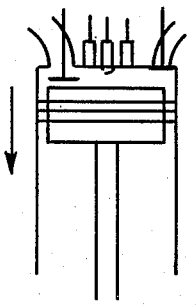
Start of Power
Start of Fuel
Injection
Start of Exhaust
Start of Intake of Air
FIG. 9A
FIG. 9B
FIG. 9C
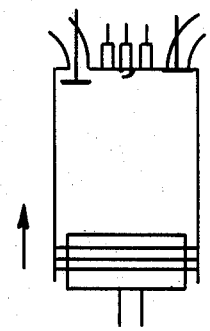
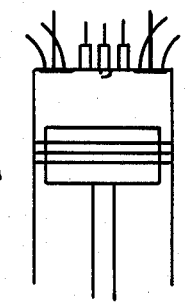
Start of Compression
FIG. 9D
FIG. 9E
FIG. 9
FOUR-STROKE DIESEL TYPE ENGINE-CRUISE

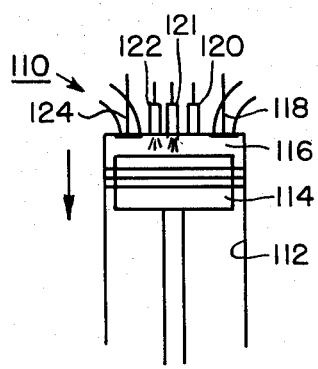
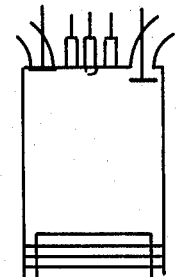
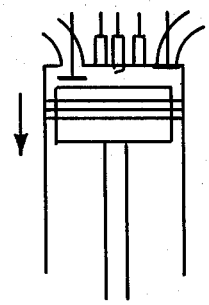
Start of Power
Start of Fuel
Injection
FIG. 10A
Start of
Exhaust
FIG. 10B
Start of
Intake of Air
FIG. 10C
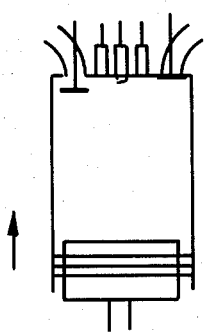
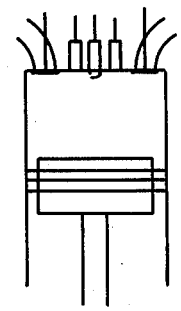
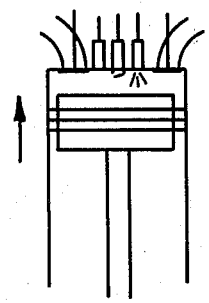
Start of
Compression
Start of
Injection of
Compressed Air
FIG. 10D
FIG. 10E
FIG. 10F
FIG. 10
FOUR-STROKE DIESEL TYPE ENGINE-POWER

INTERNAL COMBUSTION ENGINE SYSTEM

CROSS-REFERENCE TO RELATED APPLICATIONS

This application is a continuation-in-part of applicant's copending applications: (1) Ser. No. 972,786, filed Dec. 26, 1978, entitled INTERNAL COMBUSTION ENGINE; (2) Ser. No. 970,320, filed Dec. 18, 1978, entitled INTERNAL COMBUSTION ENGINE; (3) Ser. No. 955,896, filed Oct. 30, 1978, entitled INTERNAL COMBUSTION ENGINE, now abandoned; (4) Ser. No. 961,264, filed Nov. 16, 1978, entitled INTERNAL COMBUSTION ENGINE; (5) Ser. No. 955,895, filed Oct. 30, 1978, entitled TWO STROKE INTERNAL COMBUSTION ENGINE, now abandoned; and (6) Ser. No. 951,383, filed Oct. 16, 1978, entitled INTERNAL COMBUSTION ENGINE.

TECHNICAL FIELD

This invention relates to internal combustion engines of both the diesel and gasoline types and of both two and four strokes.

BACKGROUND OF THE PRIOR ART

In the present day internal combustion engines, the engine carries out a compression function. I have calculated that this compression function is accomplished at a substantial cost in on-board fuel. It is done inefficiently, adiabatically, in a single stage, and in a hot cylinder. A diesel engine, for example, uses fuel to compress about the same amount of air each stroke at cruise speed as it does while idling in a traffic jam. In land vehicles alone, and in the U.S. alone, I have estimated that approximately 6.7 million barrels of oil are burned per day to accomplish this inefficient and wasteful task.

The significance of the present invention is that by building new engines according to the invention described herein and by making minimal changes in present gasoline and diesel stock car engines, a substantial portion of this amount of oil can be saved, such as about 60% in the case of the diesel engine. That is, such portion need not be burned, and therefore it need not be imported. My copending patent application Ser. No. 29,884, filed Apr. 13, 1979, entitled INTERNAL COMBUSTION ENGINE SYSTEM, describes an invention by which all of this oil can be saved.

There is prior art on using stored compressed air for starting an internal combustion engine (see for example, U.S. Pat. No. 1,849,324). Stored compressed air is also known for use in overload situations in which it is to be fed into a combustion chamber after combustion to add some extra force. Candelise, in U.S. Pat. No. 3,017,872 shows a compressor driven by the engine for supplying a tank from which compressed air is fed into a combustion chamber during the latter portion of the expansion stroke to help burn previously unburned hydrocarbons. Further, reference can be had to the prior art of record in the six patent applications of applicant incorporated by reference herein and listed in the "Summary" section below. Prior Art on using oxygen enriched gas has problems with resultant high temperatures.

It is an advantage of the present invention to reduce the need for the U.S. to import oil.

It is an object of this invention to reduce the fuel consumption of internal combustion engines and to do so with minimum changes in present engines.

It is an object of this invention to improve the mileage (miles per gallon of fuel) of vehicles using internal combustion engines.

It is a further object of this invention to provide an internal combustion engine system in which some of the fuel-expensive, inefficient, compression function is eliminated, and in which compressed oxygen containing gas such as air, oxygen enriched air, or oxygen, efficiently generated preferably from non-oil fuel, is fed from a compressed air tank on the vehicle into the combustion chambers.

It is another object of this invention to provide an engine system capable of improved mileage with only minimal changes to present engines.

It is another advantage of this invention that it provides an engine system that can use oxygen enriched air without problems of high temperatures because of the cooling, high expansion ratio, only partial compression, and high r.p.m.

BRIEF SUMMARY OF THE INVENTION

An internal combustion engine (of either the "diesel" or "gasoline" types, either two or four stroke using either a carburetor or fuel injection, and using either spark or heat ignition), having a smaller compression ratio than expansion ratio, and including a storage tank for pressurized gas (air or other oxygen-containing pressurized gas). One aspect of this invention is that Oxygen enriched air (60–80% $O_2$) can be used without high temperature problems because of the cooling, high expansion ratio, the higher r.p.m. and the only partial compression. The engine does only enough compression to run at cruise conditions. The required oxygen for power conditions (starting, accelerating, passing, grades, etc.) is supplied (injected as pressurized gas so that no compression thereof by the engine is required) from the storage tank of compressed oxygen containing gas. The tank is charged with compressed gas from an external wayside source of compressed gas generated efficiently with central station power, preferably non-oil fueled. The engine system also includes a duct for feeding the compressed gas from the tank to the combustion chambers of the engine, means for controlling the flow of compressed gas responsive to throttle demand, means for controllably feeding fuel to the combustion chambers of the engine responsive to throttle demand, and means for igniting the air/fuel mixture (either spark or heat ignition). The means for controlling the flow of compressed air is preferably a pressure regulator connected mechanically to the foot pedal. The foot pedal can also be connected to a fuel injector to control fuel feed. The hot exhaust gas is preferably heat exchanged with the compressed air being fed into the combustion chambers.

One aspect of this invention is that Oxygen enriched air (60–80% $O_2$) can be used without high temperature problems because of the cooling, high expansion ratio, the higher r.p.m. and the only partial compression.

Another aspect of this invention is a method for saving oil comprising generating compressed air with central station power, transferring such compressed air into a compressed air tank on a vehicle, operating the vehicle internal combustion engine with only a partial compression function, and controllably feeding compressed air from the tank to the combustion chamber to be ignited with fuel during high power requirements of the engine.

Applicant's previously filed copending patent applications: (1) Ser. No. 972,786, filed Dec. 26, 1978, entitled INTERNAL COMBUSTION ENGINE; (2) Ser. No. 970,320, filed Dec. 18, 1978, entitled INTERNAL COMBUSTION ENGINE; (3) Ser. No. 955,896, filed Oct. 30, 1978, entitled INTERNAL COMBUSTION ENGINE; (4) Ser. No. 961,264, filed Nov. 16, 1978, entitled INTERNAL COMBUSTION ENGINE; (5) Ser. No. 955,895, filed Oct. 30, 1978, entitled TWO STROKE INTERNAL COMBUSTION ENGINE; and (6) Ser. No. 951,383, filed Oct. 16, 1978, entitled INTERNAL COMBUSTION ENGINE are hereby incorporated by reference in their entirety herein.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 3 is a partly diagrammatic, partly schematic showing of a four stroke gasoline engine cycle during cruise conditions according to one embodiment of this invention;

FIG. 4 is a partly diagrammatic, partly schematic showing similar to FIG. 3 except that it shows the operation during "power" conditions;

FIG. 5 is a partly diagrammatic, partly schematic showing of a two-stroke engine during cruise conditions according to another embodiment of this invention;

FIG. 6 is a showing similar to FIG. 5 except that it is during "power" conditions;

FIG. 7 is a partly diagrammatic, partly schematic showing of still another two-stroke engine during cruise conditions according to still another embodiment of this invention;

FIG. 8 is a showing similar to FIG. 7 except that it is during "power" conditions;

FIG. 9 is a partly diagrammatic, partly schematic showing of another four-stroke engine of this invention during cruise conditions;

FIG. 10 is similar to FIG. 9 except that it is during "power" conditions; and

DETAILED DESCRIPTION OF THE INVENTION

Figure 11:
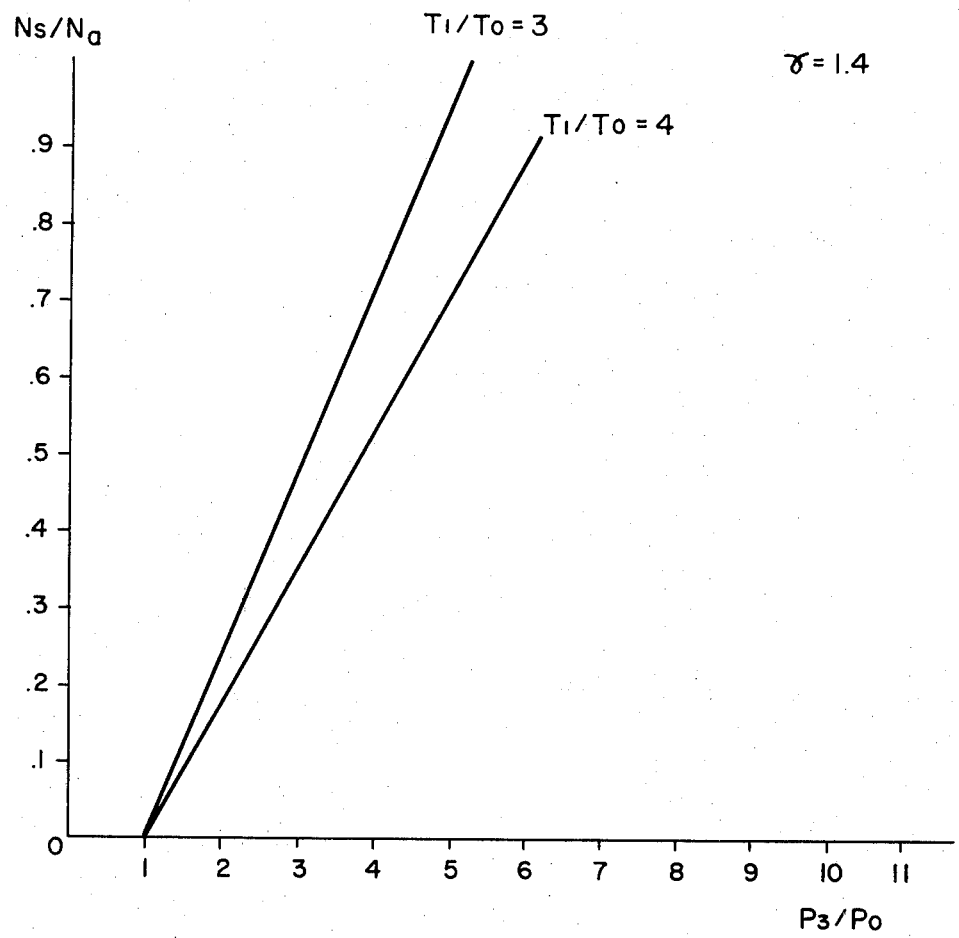
FIG. 11 is a graph of Ns/Na vs. P3/Po.

With reference now to the drawings, FIGS. 1, 2, 3, and 4 show a four-stroke gasoline engine, FIGS. 5 and 6 show a two-stroke diesel type engine, FIGS. 7 and 8 show a two-stroke gasoline type engine, FIGS. 9 and 10 show a four stroke diesel type engine, and FIG. 11 shows a graph useful in describing certain aspects of this invention.

In all of the engine embodiments of the present invention, the compression ratio is less than the expansion ratio because only a portion of the normal compression stroke is used to do any compression (Preferably just enough to operate the engine under normal circumstances such as in an automobile at 55 m.p.h., (or in a boat or stationary power supply at its normal operating condition).

When the engine is required to have greater power, this is achieved by feeding into the combustion chamber of the engine compressed gas and fuel and igniting it. The compressed gas is kept in a storage tank and is charged up from an external source (and is preferably efficiently generated using central stations, non-oil fueled power). The engine thus does not use any oil (fuel) to compress the additional air needed for the power condition (it can still do the same compression work it does under cruise conditions).

Figure 1:
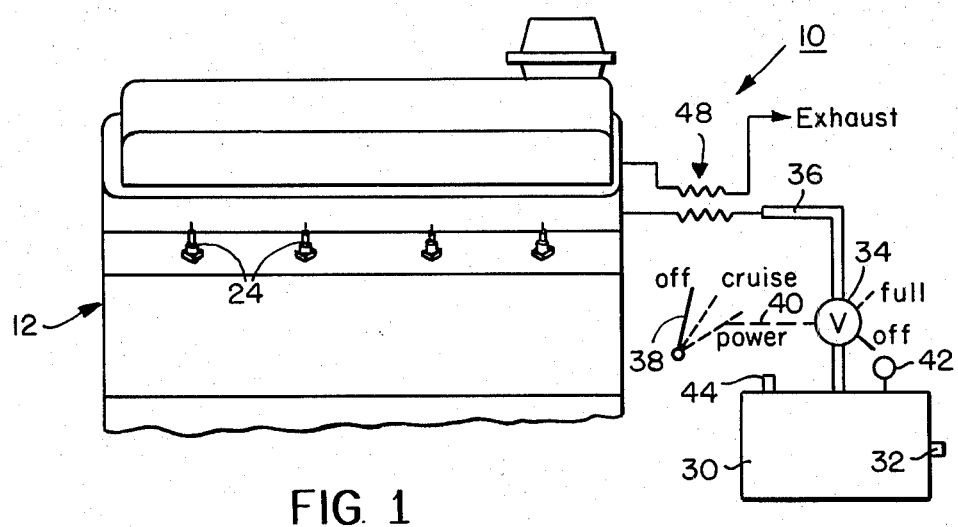
FIG. 1 is a partly diagrammatic, partly schematic view of an internal combustion engine according to one embodiment of the present invention.
Figure 2:
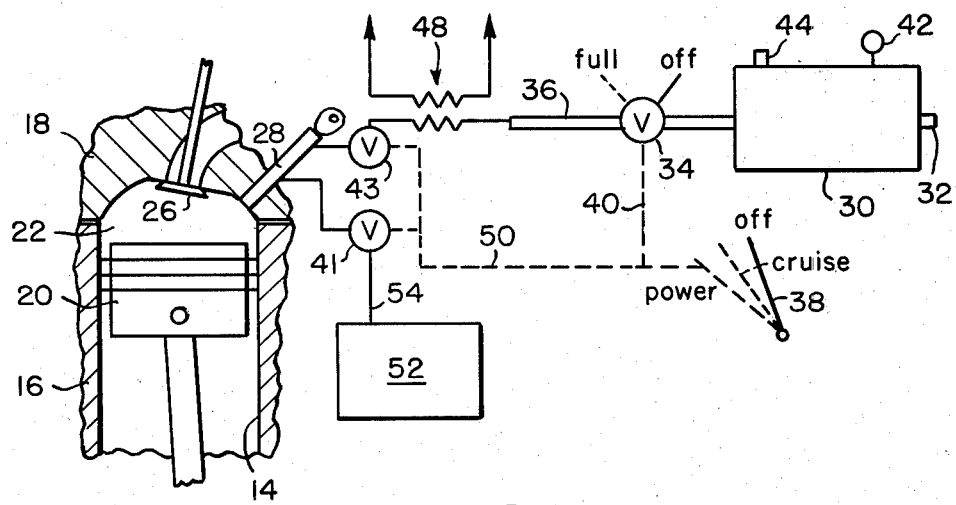
FIG. 2 is a partly diagrammatic, partly schematic partial cross-sectional view of the engine 10 of FIG. 1.

FIGS. 1 and 2 show a four stroke, gasoline, internal combustion engine 10 according to a preferred embodiment of the present invention. The engine 10 is a V-8 type including a pair of banks 12 of four cylinders 14 each in an engine block 16. The engine 10 includes a cylinder head 18 attached to the block 16 and a reciprocating piston 20 mounted in each cylinder 14. The cylinder 14, head 18 and piston 20 define and enclose a combustion chamber 22. The engine 10 also includes a spark plug 24 for each combustion chamber 22, an inlet valve 26, a standard exhaust valve (not shown) and a fuel and compressed gas injector 28. In addition, the engine 10 includes any of the well-known standard systems (not shown) for operating and timing the operation of the spark plugs 24, and the inlet valve 26 (modified as described below in more detail), the exhaust valve and the fuel injector 28. Any one of a number of well-known fuel injectors, valves, plugs, etc. can be used in this invention, as will be understood by those skilled in this, and therefore such devices need not be shown or described in detail.

The engine 10 also includes a tank 30 for holding, in this embodiment, a quantity of compressed air (e.g. up to 2500 psi or even up to 10,000 psi). Such tanks are well-known such as welders tanks, and have been certified safe for highway use. The tank 30 is charged (e.g. through a valve 32) from an external wayside source. The compressed air is preferably compressed by an efficient multi-stage compressor run by central station power (preferably of the type operating on a fuel other than oil).

The engine 10 further includes a pressure regulator 34 (also well-known as used on welder's tanks, for example) and a duct or conduit 36 for feeding compressed air from the tank 30 into the combustion chambers 22 through the injector 28.

The pressure regulator 34 is normally closed during cruise, however, at higher power demands, it varies and controls the amount and the pressure of the air fed out of the tank 30 in response to throttle demand by being connected to the foot pedal 38, for example. The connection 40 can be mechanical, hydraulic, pneumatic, or electrical and direct or through a micro-processor, e.g. The foot pedal 38 has an off and a "cruise" position at which the pressure regulator 34 is closed. It is only when the foot pedal 38 calls for higher power that it starts to open the valve 34 and feed compressed air from the tank 30 to the combustion chambers 22. FIG. 1 schematically shows the "off", "cruise" and "power" positions of the foot pedal 38. The higher the throttle demand, the higher the pressure of the air fed from the tank 30 and the higher the pressure and the larger the mass of air that will enter the combustion chambers 22.

When the foot pedal 38 is pushed far enough down so that it contacts and energizes the connection 40 in its "power" position, it also opens a valve 41 (FIG. 2) in a fuel line 54 from a fuel tank 52 to the injector 28 and a valve 43 in the conduit 36 (this valve 43 can be omitted).

The fuel injector 28 controls the amount of fuel and compressed air injected into the combustion chamber 22. The fuel injection system can be any well-known type. The timing of the fuel and air injection is preferably immediately before the piston reaches T.D.C. so that substantially no further compression of the compressed air is done. The fuel-air mixture is then spark ignited (see FIG. 3A or 4A).

The tank 30 can include a pressure gauge 42 and a pressure relief safety valve 44. The tank 52 is provided with normal connections to a carburetor for operation during cruise conditions.

FIG. 2 also shows a heat exchanger 48 for heat exchanging between the hot exhaust gas and the compressed gas just before it enters the combustion chamber 22.

FIGS. 3 and 4 show the four-strokes of the engine 10 of FIGS. 1 and 2. FIG. 3 shows the strokes during cruise conditions and FIG. 4 shows the operation during power conditions. During cruise conditions the engine 10 operates substantially like the standard known engine except that the compression ratio is less than in the standard engine and less than the expansion ratio. FIG. 3A shows the start of the power stroke; the inlet valve 26 and an exhaust valve 46 are both closed and an air-fuel mixture in the combustion chamber 22 is ignited by the spark plug 24. FIG. 3B shows the start of the exhaust stroke (the power stroke has just ended) and the exhaust valve 46 now opens. FIG. 3C shows the end of the exhaust stroke and the start of the intake stroke with the inlet valve 26 open and the exhaust valve 46 closed. The piston 20 then moves from top dead center (FIG. 3C) to bottom dead center (FIG. 3D) and then back up part way (FIG. 3E) before the inlet valve 26 closes and partial compression begins as shown in FIG. 3E. At T.D.C. (FIG. 3A) spark ignition occurs and the cycle repeats. The difference in this engine and the known engine is that the inlet valve 26 is open from FIGS. 3D to 3E to reduce the amount of compression done.

FIG. 4 shows the four strokes of the engine 10 of FIGS. 1-4 during power conditions when compressed air and fuel are injected through injector 28 as controlled by the foot pedal 38 and the pressure regulator 34. These strokes are the same as in FIG. 3 except that after the start of compression in FIGS. 3E and 4E, and at some time before the piston 20 reaches T.D.C. compressed gas and fuel are injected into the combustion chamber 22. This injection starts as close to T.D.C. as possible (to reduce as much as possible any work of compression on this air-fuel mixture by the upwardly moving piston) and preferably terminates just prior to spark ignition. The exact time of starting this air and fuel injection will depend upon several variables, such as the type of injector, and how fast it can do the injection, the timing of ignition, the type of fuel, etc.

FIGS. 5 and 6 illustrate the operation of a two-stroke diesel type engine according to the present invention with FIG. 5 illustrating the operation during cruise conditions and FIG. 6 illustrating the operation during power conditions. FIG. 5 shows schematically a diesel engine 60 including an engine block 62, a cylinder 64, a head 66, a piston 68 with connecting rod 69, a combustion chamber 70, an exhaust valve 72, an injector 74 for injecting compressed air, a fuel injector 76, and a spark plug 77. The engine 60 also includes a standard blower 80 such as a Roots blower connected to a plurality of inlet openings 78. FIG. 5 shows the cruise operation of the engine 60 which is similar to that of a standard two-stroke diesel engine with the exception that the exhaust valve 72 stays open for a first, substantial portion of the normal compression stroke, i.e. the movement of the piston 68 from B.D.C. to T.D.C., that is from FIG. 5B to FIG. 5C at which time it closes. In this way, the engine 60 does not do the standard amount of compression, but only has a compression ratio a substantial amount less than the normal compression ratio. Another difference in operation from the normal two stroke diesel is that because there is not enough heat generated from this lesser amount of compression to ignite the air-fuel mixture, the engine 60 also includes the spark plug 77 which is energized at the beginning of the power stroke as shown in FIG. 5A.

FIG. 6 shows the operation of the same engine 60 during the power conditions according to the present invention. The difference between the operation of FIG. 6 and that in FIG. 5 is that in FIG. 6 as the piston 68 approaches top dead center in FIG. 6D, the injector 74 injects compressed air from a compressed air tank such as 30 as shown in FIGS. 1 and 2. This air can be heated by a heat exchanger with the hot engine exhaust gas prior to being injected into the combustion chamber 70, however, it may still not be hot enough for heat ignition in which case the spark plug 77 is used.

FIGS. 7 and 8 show an engine 90 according to the present invention. The engine 90 is a two-stroke gasoline type engine. FIG. 7 shows the engine 90 during cruise conditions and FIG. 8 shows the operation during power conditions. The engine 90 is somewhat similar to that shown in FIGS. 5 and 6 and includes a cylinder 92, a piston 94, inlet openings 96, a combustion chamber 98, an exhaust valve 100, a spark plug 102, and injectors 104 and 106. The injector 104 injects fuel during normal cruise conditions and the injector 106 injects compressed air and fuel, during power conditions, from a compressed air tank and fuel tank as shown in FIGS. 1 and 2. FIG. 7 shows the operation during cruise conditions with FIG. 7A showing the start of the power stroke with the spark plugs 102 igniting the air-fuel mixture. FIG. 7B shows the end of the power stroke and the start of the exhaust stroke with the exhaust valve 100 open. The exhaust valve 100 then stays open according to the present invention during a first, substantial portion of the normal compression stroke until the piston reaches a position as shown schematically in FIG. 7C during which the exhaust valve 100 closes and compression begins (compression with a lower than normal compression ratio). In a standard two-stroke gasoline type engine a carburetor will be located upstream of the Roots blower, however, in the present invention the carburetor is omitted because during the movement of the piston as shown in FIG. 7C the exhaust valve 100 is open and this would cause a loss of fuel. For this reason, the engine 90 according to the present invention injects fuel through the fuel injector 104 after the piston 94 has moved beyond the inlet openings 96 and after the exhaust valve 100 is closed, so as not to cause loss of fuel out the exhaust valve. The cycle is then repeated as shown in FIG. 7A when the compressed air-fuel mixture is ignited using the spark plug 102.

FIG. 8 shows the operation of the engine 90 under power conditions. The operation is similar to that shown in FIG. 7 except that after the exhaust valve 100 closes as shown in FIG. 8C (and FIG. 7C) and as the piston 94 nears T.D.C., the injector 106 is timed to inject compressed air and fuel into the combustion chamber 98 (controlled, for example, by a foot pedal and pressure regulator as shown in FIGS. 1 and 2). The spark plug 102 then ignites the fuel-air mixture in the combustion chamber 98, and the cycle then repeats.

FIGS. 9 and 10 illustrate the operation of a four-stroke diesel type engine 110 according to another embodiment of the present invention. The engine 110 includes, for example, a cylinder 112, a piston 114, a combustion chamber 116, an exhaust valve 118, an injector 120, a spark plug 121, an injector 122, and an inlet valve 124. FIG. 9A shows the start of the power stroke with injection of fuel by the fuel injector 122 and ignition of the air-fuel mixture by a spark plug 121. FIG. 9B shows the start of the exhaust stroke with the exhaust valve 118 open. FIG. 9C shows the start of the intake stroke with the inlet valve 124 open and the exhaust valve closed. FIG. 9D shows the start of the piston up from B.D.C. after the end of the normal intake stroke. However, according to the present invention, the inlet valve is now left open for a first, substantial portion of the travel from B.D.C. to T.D.C. FIG. 9E shows the piston position when the inlet valve closes after the piston has already moved a considerable distance during a first portion of what is the normal compression stroke. The compression stroke of this invention has a much reduced compression ratio. The cycle then repeats as shown in FIG. 9A with the fuel being injected by injector 122 into the compressed air in the combustion chamber 116 and with spark ignition by the spark plug 121, because there may not be sufficient heat for heat ignition from the partial compression.

FIG. 10 shows the engine 110 operating under power conditions. The difference between the operation in FIG. 10 and FIG. 9 is as shown in FIG. 10F in which before the piston 114 reaches T.D.C., compressed air is injected into the combustion chamber 116 by the injector 120 from a compressed air storage tank as shown in FIGS. 1 and 2, for example. The cycle also then repeats as shown in FIG. 10A (or 9A) with ignition of the mixture by the spark plug. The same injector can be used for supplying the additional fuel during power conditions; a separate injector for this purpose can alternatively be used.

The following calculations considered with the graph in FIG. 11 will be of interest to those skilled in the art:

$P_o$ = Initial Pressure in Vessel
$T_o$ = Initial Temperature in Vessel
$T_1$ = Line Temperature
$P_3$ = Final Pressure in Vessel
$T_3$ = Final Temperature in Vessel $$T_3 = \frac{\gamma P_3 T_1 T_o}{(P_3 - P_o)T_o + \gamma P_o T_1}$$

$$P_o V = N_o R T_o$$

$$P_3 V = N_3 R T_3$$

$$\frac{P_o}{P_3} = \left(\frac{N_o}{N_3}\right)\left(\frac{T_o}{T_3}\right)$$

$$\frac{T_o}{T_3} = \frac{(P_3 - P_o)T_o + \gamma P_o T_1}{\gamma P_3 T_1}$$

$$= \left(\frac{1}{\gamma}\right)\left(\frac{T_o}{T_1}\right)\left(1 - \frac{P_o}{P_3}\right) + \left(\frac{P_o}{P_3}\right)$$

$$= \left(\frac{N_3}{N_o}\right)\left(\frac{P_o}{P_3}\right)$$

$$\left(\frac{N_3}{N_o}\right) = \left(\frac{1}{\gamma}\right)\left(\frac{T_o}{T_1}\right)\left\{\frac{1 - \left(\frac{P_o}{P_3}\right)}{\left(\frac{P_o}{P_3}\right)}\right\} + 1$$

$$\left(\frac{N_3}{N_o}\right) = 1 + \left(\frac{1}{\gamma}\right)\left(\frac{T_o}{T_1}\right)\left[\left(\frac{P_3}{P_o}\right) - 1\right]$$

$$\left(\frac{N_3 - N_o}{N_o}\right) = \left(\frac{1}{\gamma}\right)\left(\frac{T_o}{T_1}\right)\left[\left(\frac{P_3}{P_o}\right) - 1\right]$$

$N_s$ = Weight of Stored Gas in Vessel
$N_a$ = Ambient air in Vessel
$N_s = N_3 - N_o$ $$\frac{N_s}{N_a} = \left(\frac{1}{\gamma}\right)\left(\frac{T_o}{T_1}\right)\left[\left(\frac{P_3}{P_o}\right) - 1\right]$$

$$\frac{T_o}{T_3} = \left(\frac{P_o}{P_3}\right)\left\{1 + \frac{1}{\gamma}\left(\frac{T_o}{T_1}\right)\left[\left(\frac{P_3}{P_o}\right) - 1\right]\right\}$$

To check Example in Book
Let
$T_o/T_1 = 1$ $P_o/P_3 = 14.7/114.7 = 0.13$ $$\frac{T_o}{T_3} = 0.13\left\{1 + \frac{1}{1.4}[7.8 - 1]\right\}$$

$$= 0.13\{1 + 4.86\} = 0.76$$

$T_3 = 1.32 T_o = 1.32 \times 530 = 699.6°$ F., Abs.

Note that with some compression in engine, for example, $P_o = 2$ Atm.
then for
$P_3/P_o = 10$ $P = 2 \times 10 = 20$ Atm. at start of combustion If we demand equal parts of stored and ambient gases, $N_s/N_a = 1$ $$1 = \frac{1}{\gamma}\left(\frac{T_o}{T_1}\right)\left[\frac{P_3}{P_o} - 1\right]$$

$$\left(\frac{P_3}{P_o}\right) = 1 + \gamma\left(\frac{T_1}{T_o}\right) \quad (\gamma = 1.4)$$

| $T_1/T_o$ | $\left(\frac{P_3}{P_o}\right)$ |
|---|---|
| 1.5 | 3.10 |
| 2.0 | 3.80 |
| 2.5 | 4.50 |
| 3.0 | 5.20 |
| 3.5 | 5.90 |

| $T_1/T_o$ | $\left(\dfrac{P_3}{P_o}\right)$ |
|---|---|
| 4.0 | 6.60 |

The term "piston-cylinder-combustion chamber system" is hereby defined to include all the well-known operative means for use therewith including valves, ignition means, timing means therefor, cooling means, etc.

Another embodiment of the present invention particularly useful with automobiles in contrast to trucks and locomotives, is the use of a separate on-board compressor in conjunction with that in the storage tank. This extra compressor can be the brake-compressor described in applicant's copending application Serial No. 926,237, filed July 20, 1978, entitled VEHICLE BRAKING AND KINETIC ENERGY RECOVERY SYSTEM, which is hereby incorporated by reference in its entirety herein.

One preferred composition of the stored compressed gas is about 80% oxygen, about 20% nitrogen, and a few percentages argon. This is four times richer is oxygen than atmosphere and is easily obtained in a pressure swing operation, which is practical at service stations. As seen above, the terms "gasoline" and "diesel" are insufficient for use in describing the engines of this invention; spark ignition is used where normally there is compression (heat) ignition, for example. This invention pertains to modified present day engines as well as new factory built engines. The compressed gas can be fed in with the fuel or separately. The present invention will save significant amounts of oil at the expense of central station power (to supply the stored, compressed gas). Note that significant improvement in efficiency is achieved even during the cruise (non-compressed gas usage) period since an expansion ratio higher than the compression ratio is available.

Factory built cars utilizing this invention preferably have a high (i.e. 16:1) expansion ratio. Compression is done in an engine to achieve a reasonably high horsepower in a reasonably small engine. The important factor is amount of air (oxygen) and fuel present in the cylinder at T.D.C. since this determines the energy per stroke and hence the power. Pressure at the end of compression (T.D.C.) is often considered as the overiding consideration, but the actual mass of air determines the power and the mass of air depends not only upon pressure but also temperature. Thus, the proper viewpoint for the present case is not the pressure rise in the cylinder at T.D.C. due to the stored, compressed gas being metered into the cylinder, but rather the increase in gas (oxygen) weight introduced into the cylinder. Since the stored, compressed gas is available at high pressure (downstream from the regulator 34), it is therefore free to "pump-up" the cylinder at T.D.C. The amount of gas pumped in will be determined by the inlet pressure (after the throttle controlled regulator), the injector or valve open time, the valve pressure drop, and the cylinder gas pressure.

The vast majority of the U.S. cars are gasoline, naturally aspirated, four-stroke engines. These can be modified to use the present invention.

"Limp-along" capability can be provided by using an auxiliary compressor (manual, foot operated, operated from the gasoline engine etc.) to charge the storage tank 30 with compressed air. It is also possible to drive the auxiliary compressor by the electric starting motor (if present).

The stored, compressed gas preferably acts like a super-supercharger. That is, the only time the stored gas is used is for high horsepower demand situations: accelerating from a standing start, highway passing, high speed up a steep grade, etc. In effect, the engine will have a low compression ratio and a high expansion ratio (for high efficiency). Added power increase is achieved by ramming in high pressure air (or oxygen mixture) and fuel at or near top dead center.

The engine power depends directly upon the amount of oxygen (and hence fuel) in the cylinder when the piston is at T.D.C. (minimum volume) and the engine R.P.M. A simple equation can be written to express this:

$$\frac{(H.P.)_p}{(H.P.)_c} = \frac{(P)_p}{(P)_c} \cdot \frac{(T)_c}{(T)_p} \cdot \frac{(R.P.M.)_p}{(R.P.M.)_c}$$

Subscript p = Peak conditions
Subscript c = Cruise conditions. Constant speed at maximum condition
P = Cylinder pressure at T.D.C.
T = Cylinder gas temperature at T.D.C.

Other factors being the same, the higher power due to higher cylinder pressure (more oxygen and fuel) will automatically increase the R.P.M. The equation can therefore be written (approximation)

$$\frac{(H.P.)_p}{(H.P.)_c} = \left[\frac{(P_p)(T_c)}{(P_c)(T_p)}\right]^2$$

Now if it is assumed that the inlet charge temperature is held to be equal for the two cases, there follows:

$$\frac{(H.P.)_p}{(H.P.)_c} \approx \left[\frac{(P_p)}{(P_c)}\right]^2$$

The peak to cruise horsepower is about 5:1. Thus, a typical 50 h.p. engine will require about 10 h.p. for cruise at maximum speed. Peak acceleration periods will require about 50 h.p. Therefore $$5 \approx \frac{(P_p)^2}{(P_c)^2}$$

or $$P_p/P_c \approx 2.24$$

The pressure in the cylinder, at T.D.C. must be 2.24 greater during 50 h.p. conditions than during cruise (10 h.p.) conditions. Now the pressure at peak conditions $(P_p)$ must be 50 h.p. and correspond to the pressure conditions that would exist in an un-modified engine. Thus, a diesel at 16:1 compression ratio and a gasoline engine at an 8:1 compression ratio yields:

$(P_p)_{diesel} = 1 \text{ Atm.} \times (16)^{1.4} = 48.5 \text{ Atm.}$
$(P_p)_{gasoline} = 1 \text{ Atm.} \times (8)^{1.4} = 18.4 \text{ Atm.}$ The cylinder pressures required for the modified case, therefore, are for cruise conditions (10 h.p.):
$(P_c)_{diesel} = 21.7 \text{ Atm.}$ $(P_c)_{gasoline} = 8.2$ Atm.

The required C.R. for the modified versions then can be found from:

$(CR)_{diesel}^{1.4} = 21.7$
$(CR)_{gasoline}^{1.4} = 8.2$ from which:

$(CR)_{diesel} = 9.01$
$(CR)_{gasoline} = 4.49$

Thus, the diesel must be modified to have a CR=9.01 and the gasoline engine to have a CR=4.5. This is accomplished by new cams to adjust valve opening programs. The amount of work of compression saved can be estimated. For the diesel:

$$W = \frac{P_1 V_1}{\gamma - 1} \left\{ 1 - \left[\frac{V_1}{V_2}\right]^{\gamma-1} \right\}$$

W = Work of Compression (Ft.-Pounds)
$P_1$ = Inlet pressure (lb./ft.$^2$)
$V_1$ = Inlet volume (ft.$^3$)
$\gamma$ = Ratio of heat capacities For the present case, the inlet pressure is still 1 Atm., however, the inlet volume is less since the inlet valve will be held open for part of the cycle. Thus:

$$\frac{(W)_c}{(W)_o} = \frac{(CR)_c \{1 - (CR)_c^{\gamma-1}\}}{(CR)_o \{1 - (CR)_o^{\gamma-1}\}}$$

Where the subscript o represents the un-modified situation.

$$\frac{(W)_c}{(W)_o} = \frac{9.01\{1 - 9.01^{0.4}\}}{16\{1 - 16^{0.4}\}} = \frac{-12.8}{-32.5}$$
$$= 0.39$$

Thus, the cruise conditions in the diesel uses only ⅓ (approximately) the compression h.p. for the case modified according to the teachings of this invention. The efficiency is not reduced accordingly since a full 16:1 expansion ratio is exhibited. The total savings, of course, will depend upon how often the compressed air is used. In the limit, if the reserve acceleration is never used (always cruise conditions) then the savings would amount to about 1-0.39 or about 60% of the example (zero engine compression) in my patent application Ser. No. 29,884 filed April 13, 1979, entitled INTERNAL COMBUSTION ENGINE SYSTEM. Thus, if 3 million barrels/day would be saved if all compression were done by central station power, then the present case would save 0.64×3=1.82 MBDO by doing some compression in the engine. A similar example can be worked out for the gasoline engine. Thus, a peak-to cruise power requirement of, say, 8:1 rather than the 5:1 assumed above will require use of the stored, compressed gas for speeds of 10 m.p.h. (for example) below the cruise speed. It may be desirable to run the engine at full R.P.M. during cruise conditions. This will allow a smaller and lighter engine to serve the purpose. The extra fuel-air injected for acceleration peaks would "overdrive" the engine. This overdrive situation is permissible for the short time spans of acceleration involved.

Any of the injection methods known can be used, such as the compressed air fuel injectors described in "Fuel Injectors and Controls", Burman and DeLuca. Gas/liquid spray nozzles are old and hundreds are advertised in the Thomas Register, for example.

This invention includes the following variations:

1. Injection of oxygen containing gas directly into each cylinder, timed (via cam or electric solenoid) to be at or near T.D.C. The extra fuel can be injected by the normal carburetor via an "accelerator" pump as is standard today, see FIG. 263, pg. 188 of Burman-DeLuca, "Fuel Injection and Controls for Internal Combustion Engines".
2. Two injectors per cylinder can be used: one for the gas and one for the fuel.
3. Injection into the inlet manifold of the extra air and fuel. This would have the advantage of less injection equipment but may require a high pressure manifold.

In all cases, the preferred control is a pressure reducing regulator, controlled by the foot pedal, that controls the pressure of the gas being fed to the injector. Compression in the engine can be from nearly zero compression to about 10:1. The preferable values are about 4.5:1 for an engine built as a four-stroke Otto and about 9:1 for an engine built as a four-stroke diesel.

One aspect of the present invention is the use of the stored compressed air for use in starting the engine in place of a battery. The compressed air can also be used to fill a flat tire.

One preferred recipe for the compressed air is 40% oxygen and 60% nitrogen although any mixture percentage and types of gases can be used for various purposes (including a wide variety of combinations of air, oxygen, carbon monoxide, carbon dioxide, nitogen, water vapor, etc.). For example, to reduce $NO_x$ emissions a recipe of 40% oxygen, 40% nitrogen and 20% $CO_2$ can be used.

Further, the composition of the compressed gas can be controlled to control $NO_x$ pollution. The tank 30 need not be at any specific pressure. It can be at 2500 psi, however, 500 psi, for example, would be sufficient since the pressure regulator controls the output. Because of a much lower compression ratio the operation of the engine 10 is smooth. Fewer, smaller, high pressure cylinders can be used and without a flywheel.

Another aspect of the present invention is the use of high pressure air which is then reduced; all prior art tries to increase the pressure. While not much energy can be stored in the compressed air (a 50:1 difference compared to fuel, for example), it represents a large amount of energy presently required of the automobile to produce it. The compressed gas should be compressed as high as possible. The weight is not a problem; the volume is the problem. It is preferred to store the compressed gases as gases, since they come out the pressure regulator with the same composition put in the tank 30. The compressed gas can, however, be stored as a solid or cryogenic liquid (in which case it would have about twice the density of gasoline). However, it cannot just be vaporized and the gas taken off the top because the gases would come off at different times, for example.

Thus, one embodiment of this invention is to meter out the liquid phase, put it in a chamber and then vaporize it to get the desired composition of the gas to feed to the cylinder. Two main reasons for high pressure are to reduce storage volume and to allow rapid filling of the combustion chamber, with even modest valve size (this latter factor is especially important for the two-stroke engine).

Another aspect of this invention is that if the clearance gas is such that there is 2% $CO_2$ in the combustion chamber 22 from the clearance gas, the recipe of the compressed gas can be such as to provide 2% more oxygen. This can not be done in the present day engine, which is limited to the 20% oxygen in the atmosphere. The higher the oxygen content of the compressed gas, the higher the combustion temperature. However, various ways can be used to get the additional energy out of the engine. It is presently preferred to use 60%–80% oxygen. The higher expansion ratio in this engine will cool this gas to prevent burning of the exhaust valve.

Another aspect of this invention is the ease of starting, because there is little compression to be done and high pressure gas is available to start the piston moving downwardly. A battery and starter motor can be eliminated and the compressed air used to start the motor.

Another embodiment of this invention is to use the stored compressed gas only for peak power, to reduce engine size. In this case, injectors for the compressed gas can be used rather than cam driven valves.

The term "compressed air" as used in this specification and claims is hereby defined to include air and also gases with other percentages of oxygen and other gases than are present in ambient air.

Another feature of this invention is that on trucks already using a tank of cryogenic liquid such as nitrogen for maintaining fresh cargo, this tank can be the tank 30 in FIG. 1 (or at least a supplement to it). For example, instead of liquid nitrogen, the tank can be filled with liquid air, the liquid air drawn off and vaporized using exhaust gas heat, and this gas used as the compressed gas.

As mentioned above, a preferred composition for the compressed oxygen containing gas is 60%–80% oxygen and the rest nitrogen and some argon. This is easily obtained by the pressure swing process which can be carried out at service station. This oxygen enrichment is not subject to high temperature problems because it can be relatively cool entering the cylinder and because it is not then further compressed in any substantial degree and because the high expansion ratio, preferably 16:1 will serve to cool the gases in the combustion chamber. Where high temperature reduced efficiency in the prior art because of the additional work of compression, this is not true in the present invention. The higher power in this case also causes higher R.P.M. causing in turn faster temperature drop due to faster piston travel during expansion.

Cruise condition is the condition decided upon for a particular application (such as to maintain 55 m.p.h. in a car, or 30 m.p.h. in a car, etc.) at which the engine will have sufficient power by its own compression; any more power will require use of the stored compressed gas.

The invention has been described in detail with particular reference to the preferred embodiments thereof, but it will be understood that variations and modifications can be affected within the spirit and scope of the invention as described hereinafter and as defined in the appended claims.

I claim:

1. A method for operating an internal combustion engine including at least one piston-cylinder-combustion chamber system comprising the steps of:
    (a) operating each piston-cylinder-combustion chamber system to provide at least partial strokes consisting of inlet, compression, power, and exhaust strokes;
    (b) operating said compression stroke with a compression ratio substantially less than the expansion ratio to provide only enough oxygen to accommodate only enough fuel to supply power cruise conditions;
    (c) storing a supply of oxygen-containing compressed gas in a tank adjacent to said internal combustion engine; and
    (d) increasing the power of said engine in response to throttle demand for more power than is available from said operating steps, by feeding compressed gas from said tank to each combustion chamber during the end of said compression stroke and prior to said power stroke and also feeding a corresponding additional quantity of fuel to said combustion chamber with said compressed gas.

2. A method according to claim 1 including controlling the pressure of the compressed gas fed from said tank into said combustion chamber.

3. A method according to claim 2 wherein said controlling step comprises controlling a pressure regulator in a conduit from said tank to said engine in response to throttle demand.

4. A method according to claim 1 including spark igniting the compressed gas-fuel mixture in said combustion chamber.

5. A method according to claim 1 including heat igniting the compressed gas-fuel mixture in said combustion chamber.

6. A method according to claim 1 wherein said storing step comprises storing a compressed gas containing at least 20% oxygen.

7. A method according to claim 6 wherein said storing step comprises storing a compressed gas containing a higher percentage of oxygen than is contained in ambient air.

8. A method according to claim 7 wherein said storing step includes charging said tank to a pressure of about 2500 psi.

9. A method according to claim 1 including heat exchanging the hot exhaust gas from said internal combustion engine with the compressed gas being fed from said tank to said combustion chamber.

10. A method according to claim 1 wherein said fuel feeding step comprises injecting fuel into said combustion chamber.

11. A method according to claim 10 wherein said fuel injection comprises injecting fuel after said compressed gas has been fed into said combustion chamber.

12. A method according to claim 10 wherein said fuel injection comprises injecting fuel into each combustion chamber substantially simultaneously with said step of feeding compressed gas into said combustion chamber.

13. A method according to claim 1 wherein said engine is a four stroke gasoline engine and including leaving the inlet valve open during a first, substantial portion of the compression stroke, wherein substantially no compression is done until said inlet valve closes during a later portion of said compression stroke.

14. A method according to claim 13 wherein said increasing step comprises injecting compressed gas from said tank, and fuel, into each combustion chamber simultaneously, toward the end of said compression stroke and just prior to each piston reaching T.D.C.

15. A method according to claim 14 including spark igniting the mixture of fuel and compressed gas in each combustion chamber at the beginning of each power stroke.

16. A method according to claim 1 wherein said engine is a two stroke gasoline engine using fuel injection and including leaving the exhaust valve open during a first, substantial portion of the movement of each piston from B.D.C. to T.D.C. whereby substantially no compression is done until said exhaust valve closes during the later portion of said compression stroke.

17. A method according to claim 16 wherein said increasing step comprises injecting compressed gas from said tank, and fuel, into each combustion chamber simultaneously, toward the end of the compression stroke and just prior to each piston reaching T.D.C.

18. A method according to claim 17 including spark igniting the mixture of fuel and compressed gas in each combustion chamber at the beginning of each power stroke.

19. A method according to claim 1 wherein said engine is a four stroke diesel type engine and including the step of leaving the inlet valve open during a first, substantial portion of the compression stroke and means for closing said inlet valve during a second portion of the compression stroke, wherein substantially no compression is done until said inlet valve closes during said later portion of the compression stroke and means for injecting fuel into each combustion chamber during the start of the power stroke and including means for igniting the fuel-gas mixture in said combustion chamber.

20. A method according to claim 19 wherein said igniting step comprises spark igniting said mixture.

21. A method according to claim 19 wherein said increasing step comprises injecting compressed gas from said tank into each combustion chamber toward the end of said compression stroke and subsequently injecting fuel into said combustion chamber during the beginning of said power stroke.

22. A method according to claim 1 wherein said engine is a two stroke diesel type engine and includes the step of leaving the exhaust valve open during a first, substantial portion of the movement of each piston from B.D.C. to T.D.C. whereby substantially no compression is done until said exhaust valve closes during a later portion of said compression stroke and injecting compressed gas from said tank into each combustion chamber toward the end of the compression stroke and then subsequently injecting fuel into each combustion chamber toward the beginning of said power stroke and igniting the mixture of fuel and gas in said combustion chamber.

23. A method according to claim 22 wherein said igniting comprises spark igniting said mixture.

24. A method according to claim 22 including the step of heat exchanging the exhaust gas from said engine with the compressed gas fed from said tank to each combustion chamber.

25. Apparatus comprising:
(a) an internal combustion engine including at least one piston-cylinder-combustion chamber system;
(b) means for operating said system to provide at least partial strokes consisting of inlet, compression, power, and exhaust strokes;
(c) means for operating said compression stroke with a compression ratio substantially less than the expansion ratio to provide only enough oxygen to oxidize only enough fuel to supply power for cruise conditions;
(d) a tank for storing oxygen containing compressed gas and a conduit for feeding compressed gas from said tank to each combustion chamber; and
(e) means for increasing the power of said engine in response to throttle demand for more power than is available from said compression ratio, comprising means for feeding compressed gas from said tank to each combustion chamber during the end of said compression stroke and prior to said power stroke, and also feeding a corresponding additional quantity of fuel to said combustion chamber with said compressed gas.

26. The apparatus according to claim 25 including means for controlling the flow of compressed gas from said tank through said conduit and to said at least one combustion chamber.

27. The apparatus according to claim 26 wherein said control means comprises a pressure regulator connected to a throttle for controlling the pressure of the compressed gas fed out of said tank in response to throttle demand.

28. The apparatus according to claim 25 including means for spark igniting a compressed gas-fuel mixture in said at least one combustion chamber.

29. The apparatus according to claim 25 including means for heat igniting a compressed gas-fuel mixture in said at least one combustion chamber.

30. The apparatus according to claim 25 including means for injecting fuel into said at least one combustion chamber.

31. The apparatus according to claim 30 wherein said fuel injection means comprises means for injecting fuel into said combustion chamber after said compressed gas has been fed into said combustion chamber.

32. The apparatus according to claim 30 wherein said fuel injection means comprises means for injecting fuel substantially simultaneously with the feeding of compressed gas into said combustion chamber.

33. The apparatus according to claim 30 wherein said fuel injection means includes means for injecting fuel into said combustion chamber prior to feeding compressed gas into said combustion chamber.

34. The apparatus according to claim 25 wherein said internal combustion engine is a four stroke engine.

35. The apparatus according to claim 34 wherein said engine is a gasoline engine and including means for holding the inlet valve open during a first, substantial portion of the compression stroke wherein substantially no compression is done until said inlet valve closes during a later portion of said compression stroke, and means for closing said inlet valve during said later portion of the compression stroke.

36. The apparatus according to claim 35 wherein said means for increasing the power comprises means for injecting compressed gas from said tank, and fuel, into each combustion chamber simultaneously toward the end of said compression stroke and just prior to each piston reaching top dead center.

37. The apparatus according to claim 36 including means for spark igniting the mixture of fuel and compressed gas in each combustion chamber at the beginning of each power stroke.

38. The apparatus according to claim 25 wherein said engine is a two-stroke gasoline engine including means for injecting fuel into each combustion chamber and including means for maintaining the exhaust valve open during a first, substantial portion of the movement of each piston from B.D.C. to T.D.C. and means for closing the exhaust valve during a later portion of the movement of the piston from B.D.C. to T.D.C., whereby substantially no compression is done in said combustion chamber until said exhaust valve closes during said later portion of said combustion stroke.

39. The apparatus according to claim 38 wherein said means for increasing the power comprises means for injecting compressed gas from said tank, and fuel, into each combustion chamber simultaneously, toward the end of the combustion stroke and just prior to each piston reaching T.D.C.

40. The apparatus according to claim 39 including means for spark igniting the mixture of fuel and compressed gas in each combustion chamber at the beginning of each power stroke.

41. The apparatus according to claim 34 wherein said engine is a diesel type of engine and including means for maintaining the inlet valve open during a first, substantial portion of the compression stroke and for closing said inlet valve during a later portion of said compression stroke wherein substantially no compression is done in said combustion chamber until said inlet valve closes, and including means for injecting compressed gas from said tank into said combustion chamber toward the end of said compression stroke and just prior to each piston reaching T.D.C. and means for injecting fuel into said combustion chamber after said piston reaches T.D.C. and means for igniting the fuel-gas mixture in said combustion chamber after said piston reaches T.D.C.

42. The apparatus according to claim 41 wherein said means for igniting said mixture comprises a spark plug.

43. The apparatus according to claim 41 wherein said means for igniting said mixture includes means for heat exchanging exhaust gas from said engine with said compressed gas being fed into said combustion chamber from said tank.

44. The apparatus according to claim 38 wherein said engine is a diesel type of engine and including means for maintaining the exhaust valve open during a first, substantial portion of the movement of each piston from B.D.C. to T.D.C. and for closing the exhaust valve during a later portion of the movement of the piston from B.D.C. to T.D.C., whereby substantially no compression is done during said first portion and means for injecting fuel into said combustion chamber when the piston is approximately at top dead center and means for igniting the fuel-air mixture in said combustion chamber.

45. The apparatus according to claim 44 wherein said igniting means includes a spark plug.

46. The apparatus according to claim 44 wherein said igniting means includes means for heat exchanging the exhaust gas from said engine with the compressed gas fed into said combustion chamber from said tank.

47. The method according to claim 1 wherein said engine is a diesel type and operating said power stroke with an expansion ratio of about 16:1 and operating said compression stroke with a compression ratio of about 9:1.

48. The method according to claim 1 wherein said engine is a diesel type and operating said power stroke with an expansion ratio of about 8:1 and operating said compression stroke with a compression ratio of about 4.5:1.

49. The apparatus according to claim 25 wherein said engine has a compression ratio of about 9:1 and an expansion ratio of about 16:1.

50. The apparatus according to claim 25 wherein said engine has a compression ratio of about 4.5:1 and an expansion ratio of about 8:1.

51. The method according to claim 1 including storing in said tank a composition including 60%–80% oxygen.

52. The apparatus according to claim 25 including stored gas in said tank including 60%–80% oxygen.

* * * * *